United States Patent [19]

Dickinson et al.

[11] Patent Number: 4,910,791
[45] Date of Patent: Mar. 20, 1990

[54] MONITORING AND CONTROL OF DATA COMMUNICATIONS

[75] Inventors: Robert V. C. Dickinson, Zionsville; Joseph Rocci, Lansdale, both of Pa.; Michael Quelly, Pattenburg, N.J.

[73] Assignee: AM Communications, Inc., Quakertown, Pa.

[21] Appl. No.: 181,726

[22] Filed: Apr. 14, 1988

Related U.S. Application Data

[63] Continuation of Ser. No. 813,601, Dec. 26, 1985, abandoned.

[51] Int. Cl.[4] .............................................. H04B 3/10
[52] U.S. Cl. .......................................... 455/4; 455/9;
       455/70; 455/71; 455/115; 379/6; 358/86
[58] Field of Search ......................................... 455/2-6,
       455/8-10, 12, 67-70, 115, 237, 71; 370/74, 75,
                                    98, 97; 379/4, 6; 358/84, 86

[56] References Cited

U.S. PATENT DOCUMENTS

| | | | |
|---|---|---|---|
| 3,315,164 | 4/1967 | Ferguson et al. | 455/69 |
| 3,612,771 | 10/1971 | Caniquit | 370/74 |
| 3,732,496 | 5/1973 | Boyer | 455/69 |
| 3,750,022 | 7/1973 | Curry et al. | 455/5 |
| 3,781,703 | 12/1973 | Duty | 455/3 |
| 3,925,782 | 12/1975 | Anderl et al. | 455/69 |
| 4,245,343 | 1/1981 | Frey . | |
| 4,326,289 | 4/1982 | Dickinson | 455/5 |
| 4,450,481 | 5/1984 | Dickinson | 455/4 |
| 4,512,033 | 4/1985 | Shrock | 455/4 |
| 4,603,325 | 7/1986 | Marino et al. | 455/9 |
| 4,768,204 | 8/1988 | Zeiss | 455/70 |

Primary Examiner—Robert L. Griffin
Assistant Examiner—Marianne Huseman
Attorney, Agent, or Firm—Ratner & Prestia

[57] ABSTRACT

A method for calibrating a remote pilot unit is provided wherein both the pilot receiver and the pilot transmitter are calibrated. A test signal of a known magnitude is applied to the pilot unit and the magnitude actually received by the pilot receiver is determined. The two magnitudes are compared and a correction signal is determined. To calibrate the remote transmitter, a signal of a nominal magnitude from the transmitter is applied to a measurement device and the determination is made by the measurement device of the actual magnitude applied. The actual magnitude and the nominal magnitude are compared and a transmitter correction signal is determined. The receiver correction signal and the transmitter correction signal are stored in permanent memory within the pilot unit. This process is repeated at a plurality of frequencies to provide a signature for both the transmitter and the receiver. When the unit is installed in an RF system, signals to and from the units are compensated according to these correction signals.

8 Claims, 5 Drawing Sheets

MONITORING AND CONTROL OF DATA COMMUNICATIONS

This application is a continuation of application Ser. No. 813,601, filed 12/26/85, now abandoned.

BACKGROUND OF THE INVENTION

This invention relates to communications systems, particularly cable systems which are capable of providing a broad range of services to users. Cable systems include community antennae television, [CATV], closed circuit television, [CCTV], and broad band cable systems in general.

U.S. Pat. No. 4,326,289 "Expandable Communications Systems" filed Feb. 28, 1980 discloses a broad band communications system employing a central station, a plurality of subordinate systems stations that can be selectively addressed by the central station, and a bilateral transmission medium, for example a coaxial cable. The cable links the subordinate stations of the system to the central station where a central controller is capable of addressing a specific subordinate station and an exchanging control and message information with any addressed station.

Each subordinate systems station has a main unit with a local input port and a local output port. Each systems station may be connected over a parallel bus to a number of expansion modules. These provide additional input and output ports to accomodate different communication services. Illustrative services include selective security surveillance, energy control, meter reading, text reading, data viewing, and the like.

Because the typical subordinate station is physically located on the premises of a customer, the station may be vulnerable to unauthorized tampering. Resistance against tampering is particularly desirable in the case of CATV where it is common practice to include security functions or payment per channel. The possibility of tampering may be deterred by locating the systems station beyond the customer's premises, for example on a utility pole or within a cable vault. It is advantageous, however, to provide a communications system that is able to accomodate a plurality of special communications services for various CATV customers, and is secure against unauthorized tampering. For that purpose U.S. Pat. No. 4,450,481 "Tamper-Resistant, Expandable Communications Systems" can be employed. Each subordinate systems station is formed by two main components. One component is a remote interrogator which is mounted in a secure location outside the customer's premises, for example on a utility pole, or within a cable vault. The remote interrogator contains authorization for various services and periodically polls the other component, which is the expansion transponder module. The transponder automatically transmits signals when activated by the interrogator. A transponder module can be located securely, but other modules can be located on the customer's premises to interface any of the specific service features desired by a customer. A securely located transponder module permits any associated subscriber drop to have duration-controlled access to other channels. For less stringent applications, where the transponder module is located on premises, periodic polling of the module by the remote interrogator assumes integrity of the system for such functions as meter reading.

Each remote interrogator, using a main communications channel, exchanges control and information signals with a central control computer located at the "headend" of the CATV system. This is preferably in a serial synchronous protocol in order to reduce signalling overhead. The control and information signals are carried in radio frequency channels which are passed by the CATV components. Any of the wide variety of modulation techniques may be employed to apply the signals to the radio frequency channels. Frequency shift or phase shift keying are preferred choices.

The remote interrogator unit, using a subcombination channel, also exchanges control and information signals with many expansion transponder modules, for example several thousand, over subscriber drop cables of over parts of the CATV trunk. The mode of signal control between the remote interrogator and the expansion modules is by serial, binary, or asynchronous transmission over a radio frequency channel and is passed by the intervening system components. Although there is a broad choice of modulation techniques, frequency shift keying is the preferred choice for subcommunications channels.

In particular, the communications system is expandable and provides multipurpose digital and analog communications by having a plurality of remote interrogator units connected in a branch of the system and isolated by band-stop filters to permit simultaneous polling without interference with other operations. In addition a frequency agile oscillator is used to provide premium service control.

When there are problems in the broad-band local area network, they become apparent by malfunctions or complete failure in individual data circuits. In many situations a number of individual data circuits fail simultaneously. The problem then becomes that of locating the specific problem or fault. In order to assure high data availability on data circuits, the faults must be located as quickly as possible

SUMMARY OF THE INVENTION

In accomplishing the foregoing and related objects, the invention provides a monitor and control system in which an independent, polled data network operates under a monitor control unit.

In accordane with another aspect of the invention the monitor and control is within an overall data communications system of the kind described in U.S. Pat. Nos. 4,450,481 and 4,326,289. These patents stress multi-service architecture and protocols.

A method for calibrating a remote pilot unit is provided wherein both the pilot receiver and the pilot transmitter are calibrated. A test signal of a known magnitude is applied to the pilot unit and the magnitude actually received by the pilot receiver is determined. The two magnitudes are compared and a receiver correction signal is determined. To calibrate the remote transmitter, a signal of a nominal magnitude from the transmitter is applied to a measurement device and the determination is made by the measurement device of the actual magnitude applied. The actual magnitude and the normal magnitude are compared and a transmitter correction signal is determined. The receiver correction signal and the transmitter correction signal are stored in permanent memory within the pilot unit. This process is repeated for a plurality of test signals of differing frequencies. When the unit is installed in an RF system, signals to and from the units are compensated according to these correction signals.

DESCRIPTION OF THE DRAWINGS

Other aspects of the invention will become apparent after considering an illustrative embodiment taken in conjunction with the drawings in which.

DETAILED DESCRIPTION

Figure 1:
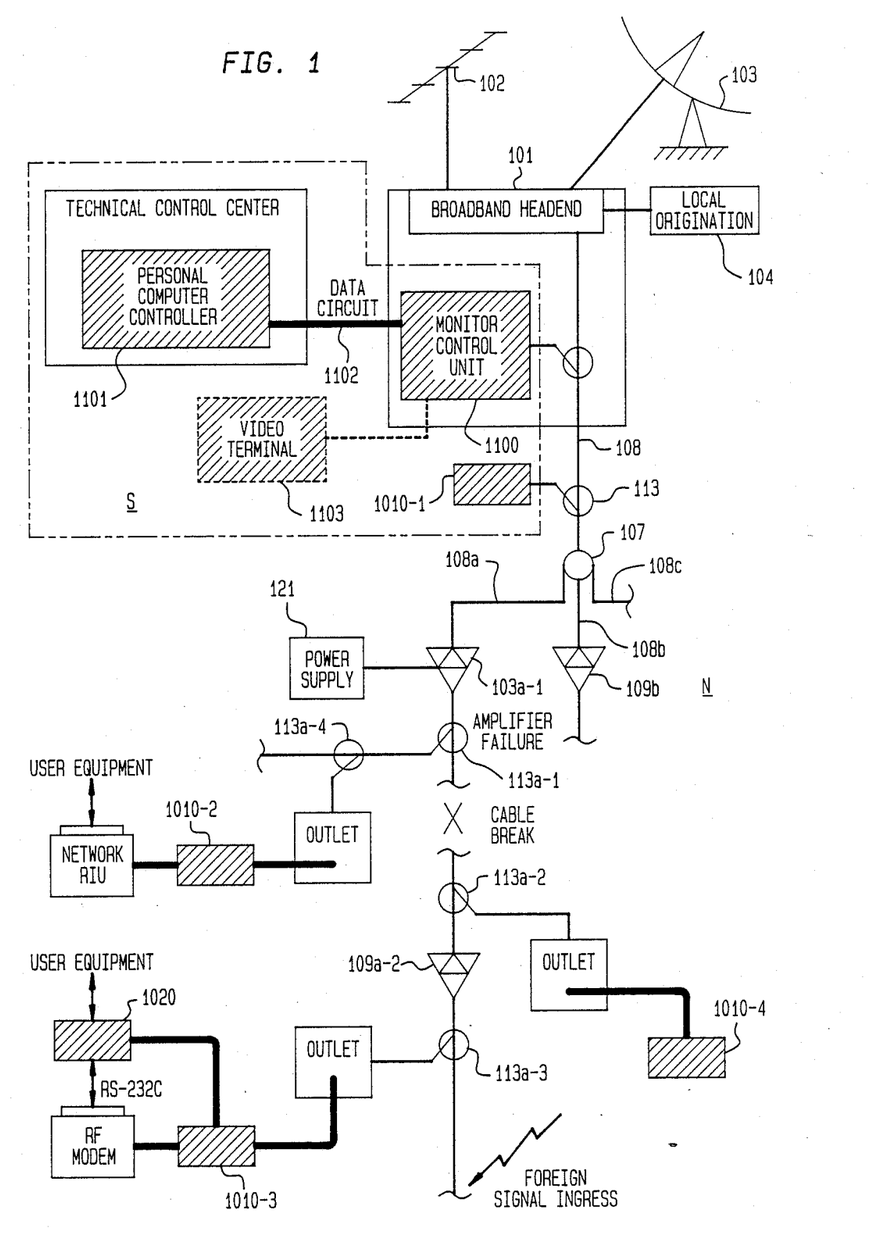
FIG. 1 is a block diagram of an illustrative monitor and control system for a broad band network in accordance with the invention.

With reference to the drawings FIG. 1 shows a headend 101, a principal trunk cable 108 and a tree of star distribution cables 108a, 108b and 108c. A plurality of different types of remote units and expansion transponder modules can be included in the network in accordance with U.S. Pat. No. 4,450,481. The remote interogator units and the expansion transponder modules occupy typical positions in the network.

All branches of the cable system emanate from the headend 101 where both signals collected from antennae 102 and satellite receiver equipment 103 may be combined with locally originated programming signals 104. The combination of signals from the antennae 102, the satellite receiver 103 and the programs of local origin 104 provide a single product that is transmitted by way of the cable 108 to various subscriber drops.

After leaving the headend 101, the signals that are transmitted are subdivided by a power divider 107 and transmitted along the various branch trunk cables 108a, 108b and 108c. Signal losses in the cables are compensated by amplifiers. An illustrative amplifier 109a-1 is in the preliminary portion of segment 108b. For simplicity the segment 108c has been curtailed but it will be understood that the remainder of the cable 108c includes customary components. The compensating amplifiers 109a-1 and 109b contain equalizers to adjust for the differences in cable loss in relation to frequency. The trunk system made of both various cables and amplifiers carries the signal to the various geographical areas that are to be served.

The signals that are delivered to subscriber's premises are generally not derived directly from the trunk system. Instead, the system is tapped at the amplifiers 109a-1 and 109b by bridger amplifiers that feed distribution cables. For simplicity the bridger amplifiers have been omitted from FIG. 1 but they are connected in accordance with the disclosure of U.S. Pat. No. 4,450,481. Losses in the distribution cables are compensated by distribution amplifiers which also contain equalizers. In both the trunk and the distribution sections of the CATV system the active components energize by way of the coaxial cable through power supplies with power inserters. An illustrative power supply 121 is shown in FIG. 1 and contains a customary power inserter.

The distribution cable, for example 108a, is tapped to feed various outputs by directional couplers or taps 113a-1, 113a-3, and 113a-4. The taps 113 are usually grouped in units of two, four or eight and are therefore known as multi-taps. For simplicity, the various taps 113 shown in FIG. 1 have a single output. A typical subscriber drop extends from a tap and supplies subscriber signals, for example to television sets [not illustrated]. In modern CATV systems, all transmission components including power dividers, trunk cables, trunk amplifiers, bridge amplifiers and power inserters, as well as distribution cables, distributions amplifiers and multi-taps are capable of bidirectional transmission.

At the headend 101 it is customary to include various components such as a control computer, a master modem, other control components of the kind shown in U.S. Pat. No. 4,450,481.

In order to provide monitoring and control in accordance with the invention, a monitor and control system S is incorporated into the overall network N of FIG. 1. Illustrative monitor and control components are shaded (with diagonal hatching) to distinguish them from the other network components.

The technical monitor and control system S includes a master control unit 1000 and a number of system deployed remote units 1010. A preliminary remote unit 1010-1 is located near the headend 101 to act as a master or system interrogator for the other remote units 1010-2 and 1010-3. It will be understood that more than one preliminary remote unit 1010-1 may be employed near the headend 101. It will be seen from FIG. 1 that the remaining remote units 1010-2 and 1010-3 are located at end user nodes throughout the network N.

Figure 5:
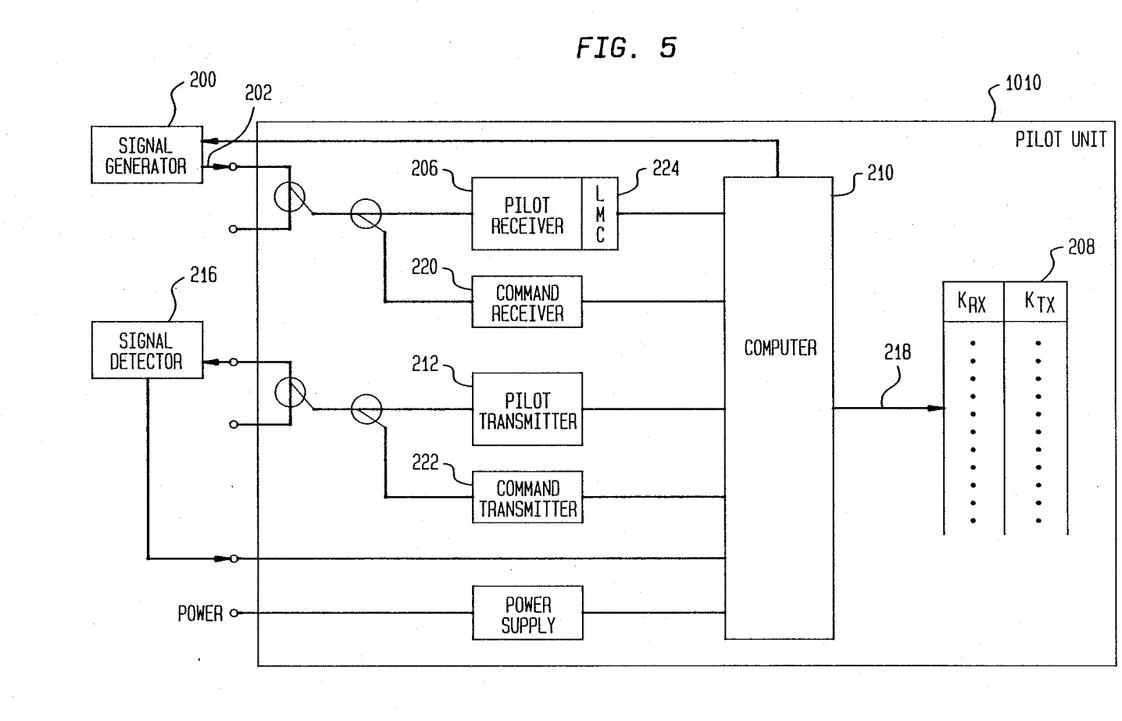
FIG. 5 is a block diagram of an illustrative pilot or a broadband network in accordance with the invention.

As shown in FIG. 5, each remote unit 1010-1 through 1010-3 contains command receiver 220 and command transmitter 222, as well as pilot receiver 206 and a pilot transmitter 212, in addition to level measurement circuit 224, microprocessor 210, and onboard memory [both temporary and permanent memory 208].

The master control unit 1000 contains a monitor control unit 1100 also having a command receiver 220 and a command transmitter 222 as previously described for remote unit 1010. It is operated by an associated microprocessor 1101 and operating system software over a data circuit 1102. A video terminal 1103 is also provided.

It is to be noted that there is an important distinction between command receivers and transmitters, on the one hand, and pilot receivers or transmitters, on the other hand. All components of the system, including those of the monitor control unit 1100 and the remote units 1010 contain command receivers and transmitters that are used for command, control and communication. The communications include such functions as addressing, on/off control and alarm notification. In addition, each remote unit 1010 contains a pilot receiver/transmitter that is used only for level measurements. For illustration, the master remote unit 1010-1 is commanded by a monitor control unit 1100 [by way of the command transmitter in the master control unit 1100 and the command receiver in the remote unit 1010-1] to generate a pilot carrier using the pilot transmitter. This pilot carrier is sent throughout the system S to pilot receivers in the remote units, for example, the units 1010-2 and 1010-3, for resulting level measurements. The system is calibrated, as described below, during production by a two-stage procedure: Receiver calibration for each remote unit 1010, followed by transmitter calibration for each remote unit 1010. The calibration factors generated during the calibration of the receivers and transmitters for the remote units 1010 eliminate the effects of transmitter level variations, filter ripple, amplifier gain/slope and circuit frequency response. As a result the monitor and control system 1000 provides a unique form of control over the system S and is applicable to communications systems in general.

(b) Calibration of 1010 Pilot Receivers

As shown in FIG. 5, each pilot receiver 206 included in remote units 1010-1 through 1010-3 is coupled to a variable-frequency, variable-output level radio-frequency signal generator 200 that is remotely controlled and exhibits a high degree of stability and resettability. For calibration of each pilot receiver 206, the signal generator 200 is set to deliver a constant output level at all frequencies used in the test.

At commencement of the test, through remote control of the output frequency, signal generator 200 is stepped to the low end of its operating frequency band (generally 42.5 MHz). This signal is injected by way of line 202 into pilot receiver (RX) input of remote unit 1010. The level of the test signal is converted to a digital level value by level measuring circuitry 224, which may include, for example, an analog-to-digital converter (not shown). Computer 210 compares the converted digital level to the actual level of the input signal and, if these levels are equal, enters an offset correction value ($K_{RX}$) of zero (0) into its permanent or non-volatile random access memory (NVRAM) 208 for the frequency under test by way of line 218. If, however, the reading is, for example, 1 dB higher than the actual input level (+6 dBmV, for example, as opposed to +5 dBmV), an offset correction value of −1 dB is entered into on-board NVRAM 208 of remote unit 1010 for the frequency under test. Similarly, if the reading is 1 dB lower than the actual input level (+4 dBmV, for example, as opposed to +5 dBmV), an offset correction value of +1 dB is entered into memory for that frequency.

The correction value ($K_{RX}$) for pilot receiver 206 of remote unit 1010 under test is according to equation (1):

$$K_{RX} = \begin{pmatrix} \text{ACTUAL} \\ \text{INPUT} \\ \text{LEVEL TO} \\ \text{PILOT} \\ \text{RX INPUT} \\ \text{OF REMOTE} \\ \text{UNIT 1010} \end{pmatrix} - \begin{pmatrix} \text{LEVEL} \\ \text{READING AS} \\ \text{MEASURED} \\ \text{BY} \\ \text{REMOTE} \\ \text{UNIT} \\ \text{1010} \end{pmatrix} \quad (1)$$

where $K_{RX}$=correction value entered into NVRAM 208 in the remote unit 1010 and $K_{RX}$ can be a negative value, zero, or a positive value, depending upon the direction of the error in the level measurement, with $K_{RX}$ assigned in a 0.5 dB increments.

The pilot receiver calibration procedure is repeated from 42.5 to 397.5 MHz in 5 MHz increments so that point-to-point ripple and slope in the frequency response measurement circuitry are fully characterized and compensated.

(c) Calibration of the 1010 Pilot Transmitters

Pilot transmitter of remote unit 1010 is calibrated primarily using an accurate broadband radio frequency level detector 216, the input of which is connected to pilot transmitter (TX) output 214 of remote unit 1010 using commands sent to the command receiver of the remote unit 1010. There is a stepping, one at a time, of each of the frequencies used in the RX calibration procedure described above. At each frequency, the detected output level is compared to a standard level reading that is equal to the specified nominal output level of pilot transmitter 212 of remote unit 1010. As with the method used in the pilot receiver calibration procedure for remote unit 1010, a correction value ($K_{TX}$) is entered into on-board NVRAM 208 of remote unit 1010 for each frequency measured. If the specified nominal output level is to be +10 dBmV, and detector 216 reads +11 dBmV, a correction value of −1 dB is entered into NVRAM 208 for that frequency. Similarly, if detector 216 reads +9 dBmV, a correction value of +1 db is entered into memory 208. If the two values (specified and detected) agree, a correction value of zero (0) is entered.

The correction value ($K_{TX}$) for pilot transmitter 212 of remote unit 1010 under test is according to equation (2).

$$K_{TX} = \begin{pmatrix} \text{SPECIFIED} \\ \text{NOMINAL} \\ \text{PILOT TX} \\ \text{OUTPUT} \\ \text{LEVEL} \end{pmatrix} - \begin{pmatrix} \text{INDICATED} \\ \text{DETECTOR} \\ \text{TX OUTPUT} \\ \text{LEVEL} \end{pmatrix} \quad (2)$$

where $K_{TX}$=correction value entered into NVRAM 208 in the remote unit 1010; $K_{TX}$ can be a negative value, zero, or a positive value, depending upon the direction of the error in the indicated detector output level; with $K_{TX}$ assigned in 0.5 dB increments.

The pilot transmitter calibration procedure is repeated from 42.5 to 397.5 MHz in 5 Mhz increments so that point-to-point ripple and slope in the frequency response measurement circuitry are fully characterized and compensated.

(d) Determination of System Frequency Response

Figure 2:
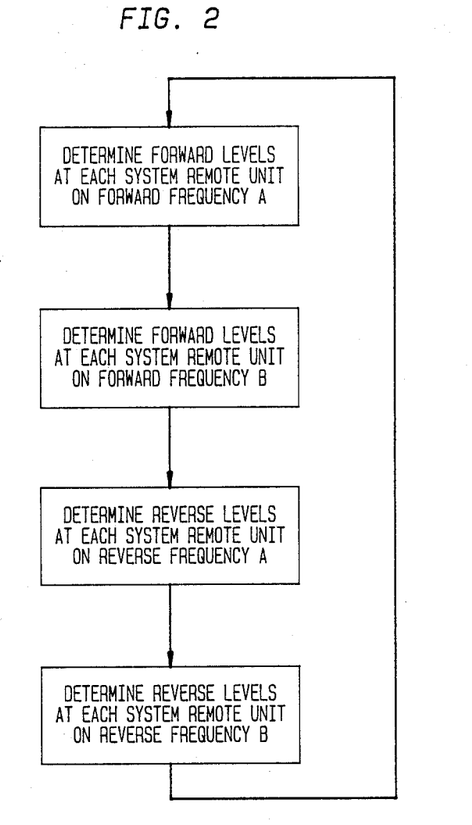
FIG. 2 is a flow chart illustrating a measurement sequence for system levels in accordance with the invention.
Figure 3:
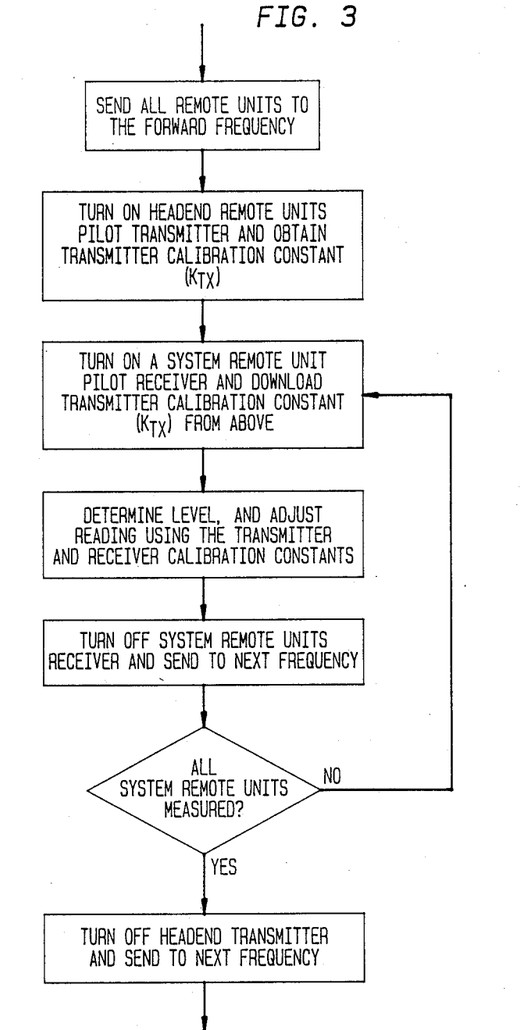
FIG. 3 is a system level flow chart for forward level measurements in accordance with the invention.
Figure 4:
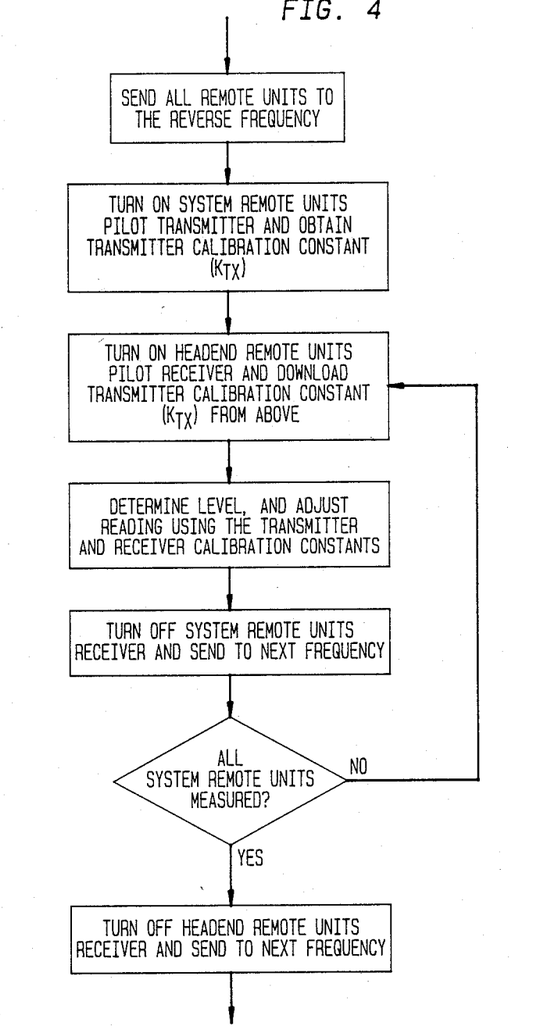
FIG. 4 is a system level flow chart for reverse level measurements in accordance with the invention.

The sequence of actions performed in the system in determining frequency response in a braod-band cable system is summarized in the flow charts of FIGS. 2–4.

(1) The Measurement Sequence

FIG. 2 provides a system level overview of the measurement process, which is a four-step loop, as described below.

Step A. An initial measurement is made of forward signal levels at each system-deployed remote unit 1010 on forward frequency A. This can be configured in software.

Step B. A measurement is next made of forward signal levels at each remote unit in the system on forward frequency B.

Step C. A measurement is then made of return signal levels from all remote units 1010 in the system on reverse frequency A.

Step D. The final measurement is of return signal levels from all remote units in the system on reverse frequency B.

The foregoing four-step loop is continually repeated, i.e., step D is followed by step A, etc. repeatedly.

(e) Determination of Forward Level Measurements

FIG. 3 details the sequence of steps required to perform the forward signal level measurements of steps A & B, above.

Step E. A command is transmitted by the monitor control unit 1100 to remote units 1010 to set their pilot receivers to the forward frequency to be measured.

Step F. The monitor control unit 110 then instructs the "master" (or headend-located, as applicable) remote unit 1010-1 to turn on its pilot transmitter and retrieve its correction value ($K_{TX}$) from memory for transmission over its command transmitter.

Step G. Another monitor control unit 1100 generated command instructs a single remote unit, e.g. 1010-2, in the system to turn on its pilot receiver. In addition, the monitor control unit 1100 loads the $K_{TX}$ correction value from the "master" remote unit 1010-1 into the memory of the units 1010-2 and 1010-3 in the system for further processing. The downloading of $K_{TX}$ is accomplished by having the master remote unit 1010-1 use its command transmitter to send $K_{TX}$ to the command receiver of the monitor control. The control unit 1100 receives $K_{TX}$ and, using its command transmitter, sends $K_{TX}$ to the command receiver of a remote unit 1010 in the system.

Step H. The remote unit measures the pilot carrier generated by the "master" remote unit 1010-1, using its pilot receiver and internal analog-to-digital (A-to-D) converter. In addition, it adds to this measurement the two associated correction values: $K_{TX}$, downloaded from the "master" remote unit, and $K_{RX}$, stored in its own on-board non-volatile memory. The sum of these values represents a fully characterized and compensated device-independent reading. It is this use of calibration-derived correction values ($K_{TX}$ and $K_{RX}$) that represents a unique approach to the measurement process.

Step I. At this point, control unit 1100 instructs the remote unit 1010 in use to turn off its pilot receiver and move to the next frequency to be measured.

Step J. The control unit 1100 then looks to see if all remote units 110 in the system have both been addressed and performed level measurements. If no, the procedure is repeated, starting at step G. If yes, the control unit instructs the "master" remote unit 1010-1 to turn off its pilot transmitter and move to the next frequency to be measured, and the procedure is repeated starting at step E.

(f) System Reverse Level Measurement

FIG. 4 details the sequence of events required to perform the reverse signal level measurements referenced in section (d), steps C and D. The procedure is similar to that used for forward signal level measurements. One exception, however, is that the pilot carriers are generated by remote unit pilot transmitters and the level measurements are performed by the "master" pilot receiver and associated A-to-D circuitry. A further distinction is that in forward level measurement, the "master" pilot transmitter "broadcasts" to all other remote units 1010 at the same time, which are then instructed on an individual basis to receive and then measure the incoming level. In reverse level measurement, each remote unit 1010 is individually instructed to turn on its pilot transmitter one at a time measurement by the "master" 1010-1.

(g) Summary

The automatic self-correcting process set forth above produces absolutely accurate level measurements that are independent of all frequency variations present in the circuitry of the transmitting and receiving remote units involved in the process. In this manner, any frequency response variations of only the transmission path between the transmitting remote unit and the receiving remote unit; rather than the frequency response variations of the remote units themselves.

A. All signal level measurements are stored in the remote units to which the measurements apply, i.e., the remote units 1010 store their own forward and reverse level measurements. The reverse level measurements are first determined by the "master" unit 1010-1 that returns this information to the individual remote unit 1010 that initiated the reverse pilot carrier under instruction from the control unit 1100. This information is then used by the remote units for alarm processing.

B. It is to be noted that all alarm processing is performed by the node-located remote units, not by the controller 1000. In this manner, each remote unit acts as an independent watchdog at its own location within the cable system in order to unburden the control unit 1000 alarm response. Once an alarm is generated by an individual remote unit, it is retained until either the control unit 1000 acknowledges the alarm or the remote unit is reset.

Other aspects of the invention will be apparent to those of ordinary skill in the art.

What is claimed is:

1. A method for calibrating a pilot receiver of a remote pilot unit for use in an RF system, the remote pilot unit having a pilot receiver and a pilot transmitter, comprising the steps of:
   a. applying a test signal of a known magnitude to the pilot unit;
   b. determining the received magnitude of the test signal actually received by the pilot receiver;
   c. comparing the known magnitude of the test signal with the received magnitude of the test signal actually received by the pilot receiver;
   d. determining a fixed pilot receiver correction signal in accordance with the comparison; and
   e. storing the fixed correction signal within the pilot unit.

2. The method of claim 1 wherein steps (a)–(e) are repeated for a plurality of test signals of differing frequencies.

3. A method for calibrating a pilot transmitter of a remote pilot unit with a specified transmit signal level for use in an RF system using a calibrated RF level detector, the remote pilot unit having a pilot receiver and a pilot transmitter, comprising the steps of:
   (a) transmitting by the pilot transmitter a test signal of a test magnitude to the RF level detector;
   (b) determining the magnitude of the signal actually received by the RF level detector;
   (c) comparing the test magnitude of the test signal as measured by the RF level detector with the specified transmit signal level;
   (d) determining a fixed pilot transmitter correction signal in accordance with the comparison; and
   (e) storing the fixed correction signal within the pilot unit.

4. The method of claim 3 wherein steps (a)–(e) are repeated for a plurality of signals of differing frequencies.

5. A method for performing signal level measurements along a data path in an RF system, the data path having a first pilot unit and a second pilot unit, each unit having a pilot receiver and a pilot transmitter, comprising the steps of:

(a) determining, in said second pilot unit, a pilot receiver correction signal, being a stored correction factor for correcting a received signal magnitude, of a signal received at a predetermined frequency, for a change in amplitude occurring at said second pilot unit;

(b) determining, in said first pilot unit, a pilot transmitter correction signal, being a stored correction factor for correcting a transmitted signal magnitude, of a signal at the predetermined frequency, for a change in amplitude occurring at said first pilot unit;

(c) forwarding the pilot transmitter correction signal from the first pilot unit to the second pilot unit;

(d) transmitting a test signal to be measured over a data path in an RF system at the predetermined frequency from the pilot transmitter of the first pilot unit to the pilot receiver of the second pilot unit; and (e) compensating, in said second pilot unit, the test signal received by the pilot receiver of the second pilot unit in accordance with the pilot transmitter correction signal received from the first pilot unit for the predetermined frequency and in accordance with the pilot receiver correction signal from the second pilot unit for the predetermined frequency.

6. The method of claim 5 wherein steps (c)–(e) are repeated for a plurality of frequencies, each pilot unit having a pilot receiver correction signal and a pilot transmitter correction signal corresponding to the frequency of the test signal to be measured.

7. The method of claim 6 wherein steps (a)–(e) are performed for a plurality of pilot units in an RF system.

8. The method of claim 6 including the further steps of sending a data signal along the data path from the first pilot unit to the second pilot unit wherein the steps (a)–(e) are performed using the data signal in place of the test signal.

* * * * *